United States Patent [19]

Ruck et al.

[11] 4,456,214

[45] Jun. 26, 1984

[54] MOLDING APPARATUS WITH POSITIVE COLLAPSE CORE

[75] Inventors: Wilf Ruck; Brian Russell, both of London, Canada; George L. Roehr, Waltham; Paul R. Catalanotti, Needham Heights, both of Mass.

[73] Assignee: Roehr Tool Corporation, Waltham, Mass.

[21] Appl. No.: 447,308

[22] Filed: Dec. 6, 1982

Related U.S. Application Data

[63] Continuation of Ser. No. 251,279, Apr. 6, 1981, abandoned.

[51] Int. Cl.³ ............................................... B22C 9/24
[52] U.S. Cl. ...................................... 249/144; 249/59; 249/178; 425/438; 425/DIG. 58
[58] Field of Search ..................... 249/59, 144, 178; 425/438, DIG. 58

[56] References Cited

U.S. PATENT DOCUMENTS

| | | | |
|---|---|---|---|
| 3,618,170 | 11/1971 | Owens | 425/449 |
| 3,660,001 | 5/1972 | Roehr | 425/396 |
| 4,130,264 | 12/1978 | Schröer | 249/59 |

Primary Examiner—Donald E. Czaja
Assistant Examiner—Mary A. Becker

[57] ABSTRACT

A molding core has side by side segments assembled for rocking about pivots intermediate their ends, and are rocked to their alternate positions by an actuating pin (or pins) having camming surfaces for that purpose, arranged for non-interference of the pin with the rocking movements of the segments.

16 Claims, 7 Drawing Figures

U.S. Patent  Jun. 26, 1984  4,456,214
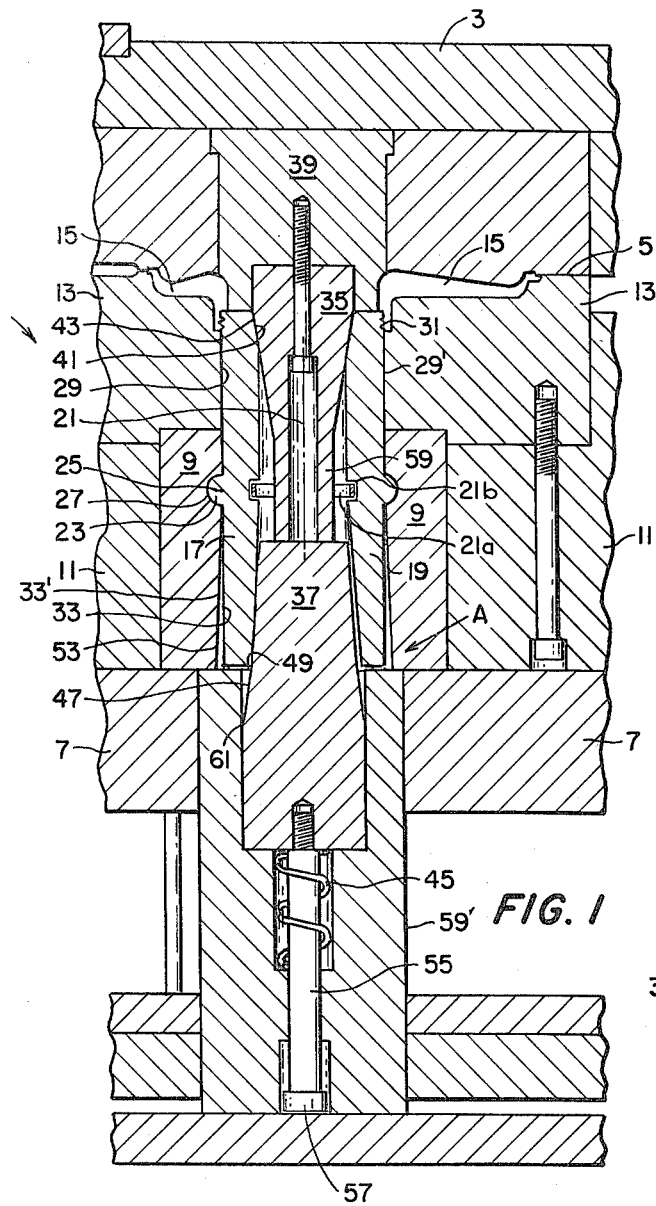
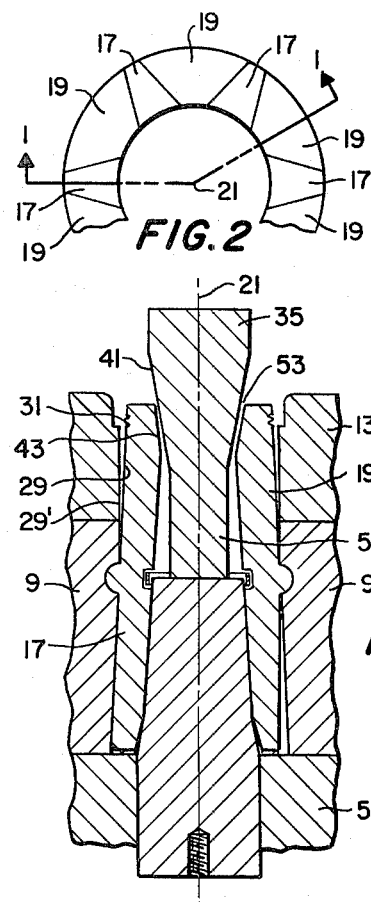
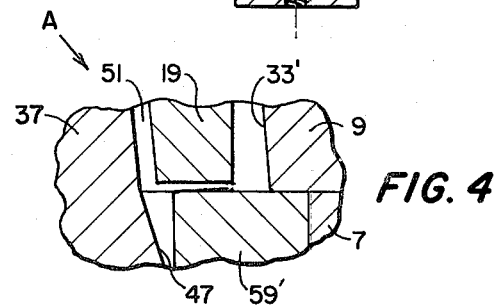
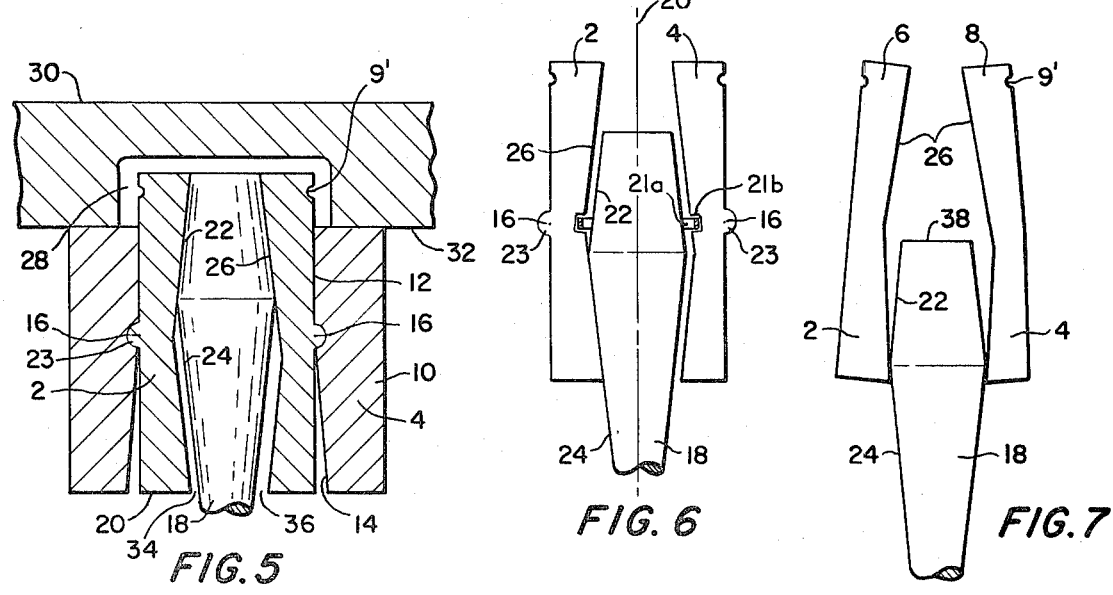

MOLDING APPARATUS WITH POSITIVE COLLAPSE CORE

This application is a continuation of our copending application, Ser. No. 251,279 filed Apr. 6, 1981, now abandoned.

BACKGROUND OF THE INVENTION

This invention relates to positively expandable and collapsible cores used in molding plastic articles having internal surfaces that include threads, grooves, recesses, perforations or other undercut shapes formed in whole or in part by a core that includes longitudinal segments arranged about a longitudinally extending core pin. Certain adjacent segments are in contact within the mold cavity and define contiguous mold surfaces for a corresponding inner wall surface of the molded part. To separate the core from the molded part those contacting segments are moved radially inwardly. One type of core wherein adjacent contacting segments are collapsed radially inwardly to permit retraction as exemplified by U.S. Pat. No. 3,660,001 to Roehr is subject to the limitation that it requires flexing of the segments. Other cores wherein adjacent segments collapse radially inwardly, as exemplified by U.S. Pat. Nos. 3,339,242 or 3,482,815 or 3,584,111 or 4,130,264 are subject to limitations both as to costs and operation because they require complex sliding structures for guiding and/or effecting the radial inward movement of the contiguous core segments.

It is an object of this invention to provide a radially inwardly collapsible core wherein contiguous segments are pivoted for rocking movement without the imposed condition of flexing with its inherent limitations, and wherein the mounting and the actuation of the segments is effected in a simple, economical, and reliable manner.

It is further object of this invention to provide an inwardly collapsible core wherein adjacent segments are mounted for rocking movement between their alternate positions by a movable actuator-pin (or pins) wherein the actuator pin holds the segments in their molding positions and, preparatory to the movement of the adjacent segments to their alternate positions it first frees that hold and then initiates the rocking movement to the alternate position.

It is a still further object of this invention to provide an inwardly collapsible core of the above mentioned type wherein the actuating pin has separate camming surfaces for causing each of the segments to rock in its two respective directions, and those surfaces are spaced apart so that upon movement of the actuator in a direction reverse from its previous movement there is a delay in causing a reverse rocking of the molding segments. This assures clearance for the movement of the segments and the actuating pin.

BRIEF DESCRIPTION OF THE DRAWING

FIG. 1 is a sectional view of a tool embodying this invention, taken along the line 1—1 of FIG. 2;

FIG 2, is an enlarged fragementary top view of assembled segments of the core in the molding position;

FIG. 3 is a diagram showing the core segments of FIG. 1 in their release position;

FIG. 4 is an enlargement of a portion of the tool in the area "A" of FIG. 1;

FIG. 5 is a sectional view showing another embodiment of this invention;

FIG. 6 is a diagram of the core segments of FIG. 5 in an intermediate position; and FIG. 7 is a diagram showing the core segments in the release position, the elements 16 and 23 as shown in FIG. 6 have been omitted for clarity.

DESCRIPTION OF A PREFERRED EMBODIMENT

In the drawings like reference numerals represent like parts.

FIG. 1 shows an embodiment of this invention for molding a plastic article that comprises a complex flange-like portion having an internally threaded neck, in this case off-center, which constitutes an opening through the flange. The mold is shown in its closed position. It comprises a lower mold section 1, and an upper mold section 3, separable vertically at a parting line 5. The lower mold section includes a lower plate 7 on which rests a core assembly comprising segments mounted in a carrier sleeve mount 9 which, in this illustration, comprises split ring halves held together in a cylindrical bore in a lower holding plate 11 which is bolted to an upper plate 13. The plate 13 defines a part of a mold cavity 15. In this example there are twelve core segments of which six alternate ones 17 are alike. At their outer peripheries they are narrower than the outer peripheries of the intervening alternate segments 19 which, in this embodiment, are also all alike. The segments are assembled about a common longitudinal axis 21 around a ring 21a in oversized grooves 21b in the segments. Each segment has a semi-cylindrical pivoting projection 23, centered at 25 and each is journalled in semi-cylindrical surfaces 27 in the sleeve 9. The segment surfaces 29 in their molding position of FIG. 1 are in contact with a cylindrical bore 29 in the sleeve 9 and with a corresponding cylindrical bore 29' in the plate 13, both centered about the axis 21. Within the mold cavity each segment is movable to contact with the adjacent segments. Thread portions 31 on the respective segments are continuous from segment to adjacent segment and form a core surface for molding a continuous helical thread, extending in this case through at least 360° on the interior surface of the molded product. This is only one example wherein separation of the core from the molded product by a longitudinal movement of one with respect to the other is made possible by a collapsible core. In each segment when in the molding position of FIG. 1 the surface 33 slopes away from the adjacent surface 33' of the bore in the sleeve 9 to allow the segment to be rocked from its molding position of FIG. 1 to its release position of FIG. 3. In the sleeve 9 the surface 33' tapers radially outwardly from the arcuate surface 27 to the lower end of the mount 9.

Each segment is rocked between its alternate positions by an actuator which is longitudinally reciprocable to and fro between a molding position of FIG. 1 and a release position of FIG. 2. The actuator comprises upper and lower actuating pins 35 or 37 respectively, which are in alignment along the axis 21. The pin 35 is secured to a holder 39 held in the upper mold section 3. The holder in this instance forms a part of the mold cavity 15. The pin 35 has an actuating cam having an upper conical camming surface 41 which bears against corresponding follower cam surfaces 43 of the respective segments to rock the segments to and hold them in their molding position of FIG. 1. In moving to this position, due to the downward closing movement of the upper mold section, the bottom of the upper pin 35 has pushed the cyindrical lower portion of the bottom pin to a stop position in the bore of a column 59', at the same time compressed a spring 45.

After the completion of each molding operation the upper mold section 3 rises from the lower section 1, raising the pin 35. This releases the force of the surface 41 against the segments, and frees the lower pin 37 to follow the pin 35 upward, by the force of spring 45. The lower pin 37 has an actuating cam surface 47. The rising cam surface 47 of the pin 37 bears on the portion 49 of each of the six spaced apart segments 17 which constitute cam followers causing each segment to rock about its own pivot axis 25. The upper end of those six segments move inwardly towards the axis 21, this being permitted by the continuing rise of the surface 41 of the pin 35. If, for any reason, the rising cam 47 tends to rock any segment faster than is permitted by the receding pin 35 that segment will hold the pin 37 momentarily from further rising. The pin 35 continuing its rising merely separates from the pin 37. Its continued rising raises the camming surface 41 thus permitting resumption of the rocking of that segment by the resuming upward movement of the pin 35. The actuating pins and the rockable segments never mutually lock one another against normal operation.

In the position of FIG. 1 the bottoms of the six segments 19 are spaced from the cam surface 47, as indicated at 51. The initiation of the release rocking of these segments is therefore delayed until the cam surface 47 rises sufficiently to close the space 51. At that time the tops of the segments 17 have already moved inwardly to provide space for the commencement of the inward movement of the tops of the segments 19. Continuing upward movement of the pin 37 continues the radial inward movement of the tops of the segments 17 and 19. The upward movement of pin 37 is halted by a rod 56 which depends from the pin 37 and has a head 57 that has limited movement in a bore in the bottom of the column 59 upon which the carrier sleeve 9 rests.

In this tool the inward movement of the molding portions of the segments 17 exceeds twice that of the movement of the corresponding ends of the segments 19.

The mold part 3 continues its separating movement from the part 1 sufficiently at least to allow the usual ejector mechanism to eject the molded article.

The mold may be reclosed in the usual manner to repeat the molding process. This involves lowering the mold part 3 towards the position of FIG. 1. The stem 59 of the pin 35 is of a smaller diameter than the opening formed by the top ends of the segments in their release position. In its descent the stem 59 reaches the top of the pin 37. At that time there is a small space 53 (FIG. 3) between the conical camming surface 41 and the segment surfaces 43. Further descent of the pin 35 causes corresponding descent of the pin 37. This first removes the holding pressure, if any existed, of the surface 47 against the lower ends of th segments 17, thus freeing them for rocking movement towards their molding positions. In the continuing descent of the pin 35 the surfaces 41 and 43 engage and rock all of the segments to their molding positions of FIG. 1. The pin 37 is being pushed downwardly thereby precluding interference of the pin 37 with the movement of the bottoms of the segments towards the axis 21. The differences in rocking action of different segments is obtained by differences in the segments. No particular circular alignment is required of the pins 35-37 with respect to any particular segment.

FIGS. 5, 6, and 7 show a modification of this invention as applied to a singlepin core, in this instance for molding a plastic closure cap, with a neck that has an internal projection. FIG. 5 shows a section corresponding to that taken on the line 1—1 of FIG. 2. Here, as in the tool of FIG. 1, there are six identical alternate segments 2, and six identical intervening alternate segments 4 corresponding to the segments 17 and 19 respectively, as shown in FIG. 2. Each segment 2 and 4 has a projection 23 centered at 16 and journalled in the surfaces 27 as in the tool of FIG. 1; and has the holding ring 21a in grooves 22b, illustrated in FIG. 6 but not in FIG. 5 to better show the spacings 34-36. Head portions 6 and 8 form a continuous circular core surface having grooves which are continuous between adjacent segments to constitute a helical thread 9'.

The segments 2-4 are assembled in a mount comprising a carrier sleeve 10 which has a cylindrical bore 12 that merges with a bore 14 which has an outward conical taper, the pivot center 16 for each of the twelve segments being located at what would be juncture of the two conical tapers. An actuator pin 18 whose longitudinal axis 20 coincide with the longitudinal axis of the carrier sleeve 10 extends into the assembly of the segments. The pin is circular in sections at right angles to the axis 20. In the molding position, FIG. 5, the top of the pin 18 forms a contiguous surface with the tops of the segments. A top view of the assembled segments will be that shown in FIG. 2.

In the molding position (FIG. 5) the conical surface 22 of the actuator is in contact with corresponding surfaces 26—26 of the segments. The projections 23 hold the segments against longitudinal movement in the sleeve 10.

In the molding position one end of the core assembly extends into a mold cavity 28 in a cavity plate 30 which is movable with respect to the carrier sleeve 10, meeting at a parting line 32. The cavity is shaped to the outside shape of the cap, the core forms the inside shape of the cap. The cap, in its simplest form, is a circular disc having a surrounding rim or neck the inside surface of which has the thread forming portions for threading the cap on the threaded neck of a bottle or the like.

After the molding operation the pin 18 is retracted to the position of FIG. 7. As it moves to the intermediate position of FIG. 6 it releases its hold on the upper end of the segments 2-4, freeing them for inward movement to their release position. Until the actuator reaches the position of FIG. 6 it does not cause such movement because of the spaces 34 between the actuator and each of the six segments 2, and the greater spaces 36 between the actuator and the six segments 4.

In the position of FIG. 6 the conical surface 24 of the actuator is in engagement with the facing surfaces of the six segments 2, and the widest part of the actuator is well below (axially) the pivot center 16. Continued descent of the actuator rocks each of the segments 2 about the pivot 16 towards their release position but has no immediate action on the segments 4 because of the greater width of the space 36. When the descending actuator has closed the gap 36 its continuing descent causes it to rock those segments also. At that time the heads of 6 of the segments 2 have moved sufficiently towards the axis 20 to provide space for the corresponding movement of the heads 8. Here, as in the embodiment of FIG. 1 the space 36 is sufficiently larger than the space 34 so that the segment 4 rocks through about half of the arcuate extent of the rocking of the segment 2. The top 38 of the pin 18 in the position of FIG. 6 has sufficient clearance from the sides of the segments 2-4 to avoid interference with the commencing rocking of the segments towards the position of FIG. 7.

To rock the segments from the release position of FIG. 7 back to the molding position of FIG. 5 for repeating the molding cycle the actuator 18 is moved upwardly. Its initial movement frees the holding pressure on the lower ends of all the segments leaving them free for inward movement but no such movement is caused by the actuator until the periphery of the top 38 of the actuator reaches the surfaces 26 of the segments 2. This is a position substantially above the pivot axis 16 in the direction of axial movement of the actuator. It is at that location on the surfaces 26 of the segments 2 that the initial forces are applied to initiate their rocking to their molding positions. At that time the lower conical surface 24 of the actuator pin 18 is sufficiently close to the final position of FIG. 5 that the surface 24 of the pin 18 does not interfere with radial inward movement of the bottoms of the segments caused by the opposite movement of the tops of the segments by the rising actuator 18. As the segments 2 rock towards their molding positions they rock the intervening segments 4 towards their molding positions. When the segments 2 have reached their molding positions the segments 4 have also reached their molding positions, the positions illustrated in FIG. 2.

In the movement of the actuator from the molding position of FIG. 5 to the position of FIG. 6 it creates a space between the actuator top 38 and the segments (FIG. 6) before the rocking movement of the segments is initiated. There is thus sufficient space between the segments and the receding top 38 so that the rocking movement of the lower ends of the segments caused by the descending actuator will not be prevented by portions of the segments above the pivot 16 colliding with the receding top portion of the pin 18.

What is considered new and sought to be covered by Letters Patent is:

1. A mold which together with a core provides a cavity for molding an article at least a part of which is hollow and wherein the shape of the article precludes a straight line longitudinal withdrawal of the core from the molded article, the core comprising separate individual segments, a mount for holding the segments against longitudinal movement in the mount and providing fixed pivot axes for the respective segments so that each may rock about an individual axis between a molding position and a release position, at least two adjacent segments being in contact with each other within the mold cavity when the segments are in the molding position, an actuator for rocking the segments from one of said positions to the other, said actuator initiating the inward rocking of the molding portions of said two adjacent segments sequentially so that the rocking of one of them provides space for the rocking of the other.

2. Apparatus according to claim 1 wherein the actuator includes pin means extending longitudinally of the core and having with the respective segments a first set of surfaces for moving the segments in one direction upon movement of the pin means in one direction and a second set of surfaces for moving the segments in the reverse direction upon reverse movement of the pin means.

3. Apparatus according to claim 2 wherein the actuating pin means extends through the cavity and comprises two axially separable pins in longitudinal alignment with one bearing against the other and spring means for urging said one pin longitudinally towards the other, one of the surfaces of one of said sets of cooperating surfaces being on one of the aligned pins and one of the surfaces of the second set of cooperating surfaces being on the other pin.

4. Apparatus according to claim 2 wherein the actuator pin means comprises one pin that includes two camming surfaces one of which is of the first set of surfaces and the other of which is of the second set of surfaces.

5. Apparatus according to claim 4 wherein rocking axis for each segment is intermediate the ends thereof whereby when one end moves radially inwardly the other end moves radially outwardly.

6. A mold which together with a core provides a cavity for molding an article having an interior shape that precludes separating the core and the article from one another by a straight line withdrawal movement in a direction lengthwise of the core from the molding position of the core within the article, the core comprising an assembly of individually separate longitudinally extending segments, a sleeve mount holding the segments and providing pivot axes for the respective segments so that each may rock about an individual axis between a molding position and a release position, an actuator for rocking the segments from one of said positions to the other, said actuator being movable to and fro between a core molding position and a core release position, each segment having first and second cam followers on the side thereof that faces the actuator and on each segment the followers are displaced from one another longitudinally of the segment with the rocking axis of the segment between the followers, and holding means for each segment permitting rocking of the segment but holding it against longitudinal movement with respect to the mold by the force exerted by the actuator against the corresponding cam follower for rocking the segment from its molding position to its release position, and means for operating the actuator to rock said segments to their release position while the article is still in the mold cavity.

7. Apparatus according to claim 6 wherein the individual rocking axis for each segment is between the ends thereof whereby when one end moves radially inwardly the other end moves radially outwardly.

8. Apparatus according to claim 6 wherein the parts of the segments within the cavity extend through 360° and when in their molding position each such part is in contact with the corresponding parts of the adjacent segments.

9. Apparatus according to claim 6 wherein the pivot axis of each segment comprises means for holding the segment against longitudinal movement in the mount.

10. Apparatus according to claim 6 wherein for each segment the rocking axis is fixed with respect to the sleeve mount and holds the segment against longitudinal movement with respect to the sleeve mount when the actuator is moving in each of its to and fro directions.

11. Apparatus according to claim 6 wherein for each segment the holding means comprises a projection receiving socket formed in the sleeve mount and a cooperating radially outwardly extending projection extending from the segment into the socket.

12. Apparatus according to claim 6 wherein two adjacent segments form a contiguous molding surface of a shape which precludes the initiation of the release movement of those two segments simultaneously, and the cam followers of the two segments are arranged to initiate the rocking of those two segments to their release positions sequentially so that the rocking of one provides space for the rocking of the other.

13. Apparatus according to claim 11 wherein the projection on each segment is semi-cylindrical and the socket is semi-cylindrical, the projection fitting and being rockable in said socket but being held by the socket against movement in a direction longitudinally of the segment.

14. Apparatus according to claim 6 wherein said holding means is provided by said mount and said segments having cooperating means journalling the respective segments in said mount for their respective rocking movements and by the journal restraining longitudinal movement of each segment with respect to the mount that holds the segments.

15. Apparatus according to claim 6 wherein said holding means includes for each segment a radially outward projection and the mount includes for each segment a socket into which the outward projection of a corresponding segment extends and in which it is journalled for rocking movement and the socket acting on the projection restrains longitudinal movement of the segment with respect to the mount.

16. Apparatus according to claim 6 wherein the actuator and the segments are arranged around the longitudinal axis of the actuator and are rockable about their respective pivot axes towards and from the longitudinal axis of the actuator, at least some segments being at an angle to one another and when in their molding position contiguous with and contacting one another within the cavity to form contiguous surface areas of the article to be molded.

* * * * *